(12) United States Patent
Berthele et al.

(10) Patent No.: US 11,802,934 B2
(45) Date of Patent: Oct. 31, 2023

(54) AUTO-LOCATION METHOD AND SYSTEM USING RADIOELECTRIC SIGNALS, CORRESPONDING PROGRAM AND PROGRAM MEDIUM

(71) Applicant: SAGEMCOM BROADBAND SAS, Rueil Malmaison (FR)

(72) Inventors: Patrick Berthele, Rueil Malmaison (FR); Jean-Philippe Jaulin, Rueil Malmaison (FR)

(73) Assignee: SAGEMCOM BROADBAND SAS, Rueil-Malmaison (FR)

(*) Notice: Subject to any disclaimer, the term of this patent is extended or adjusted under 35 U.S.C. 154(b) by 0 days.

(21) Appl. No.: 17/786,356

(22) PCT Filed: Dec. 18, 2020

(86) PCT No.: PCT/EP2020/087310
§ 371 (c)(1),
(2) Date: Jun. 16, 2022

(87) PCT Pub. No.: WO2021/123374
PCT Pub. Date: Jun. 24, 2021

(65) Prior Publication Data
US 2023/0042647 A1    Feb. 9, 2023

(30) Foreign Application Priority Data
Dec. 19, 2019   (FR) ...................................... 1914966

(51) Int. Cl.
*G01S 5/02*         (2010.01)
*G01S 13/76*       (2006.01)

(52) U.S. Cl.
CPC .......... *G01S 5/0289* (2013.01); *G01S 13/765* (2013.01)

(58) Field of Classification Search
CPC ....... H04W 4/80; H04W 64/006; H04W 4/02; H04W 48/16; H04W 24/02; H04W 4/00;
(Continued)

(56) References Cited

U.S. PATENT DOCUMENTS 8,717,952 B2    5/2014   Hibara et al.
9,247,388 B2 *  1/2016   Dini .................... G01S 5/02521
(Continued)

FOREIGN PATENT DOCUMENTS

EP          2692184 A1    2/2014
WO    WO2012131744 A1   10/2012

*Primary Examiner* — Olumide Ajibade Akonai
(74) *Attorney, Agent, or Firm* — Muncy, Geissler, Olds & Lowe, P.C.

(57) ABSTRACT

An auto-location method for electronic equipment items provided with a transmitter/receiver of radioelectric signals, includes the steps of: establishing a list of the equipment items with their relative position and the measurements of distances between the equipment items, detecting, using the list, at least one non-measured distance between a first equipment item and a second equipment item, the transmitter/receiver of which has a plurality of available operating modes, changing the operating mode of the transmitter/receiver of the second equipment item and attempting to measure the distance between the first equipment item and the second equipment item, and updating the list with the last distance measured. A system and a program implement this method.

13 Claims, 6 Drawing Sheets

(58) Field of Classification Search
CPC ......... H04W 8/18; H04W 8/24; H04W 84/18;
H04W 64/00; H04W 4/025; H04W 84/12;
H04W 8/005; H04W 16/18; H04W 4/029;
H04W 4/023; G01S 5/30; G01S 11/06;
G01S 5/0226; G01S 5/0284; G01S
5/0289; G01S 13/765; G01S 5/0205;
G06Q 10/08; G06Q 10/087; G06Q
30/0261; G06Q 30/0267; G06Q 10/0833
See application file for complete search history.

(56) References Cited

U.S. PATENT DOCUMENTS

| | | | |
|---|---|---|---|
| 10,454,820 | B2* | 10/2019 | Garcia-Luna-Aceves ................... H04L 67/63 |
| 2007/0080799 | A1* | 4/2007 | Werenka ............... H04L 67/125 340/506 |
| 2010/0039284 | A1* | 2/2010 | Hall ....................... G06Q 10/08 340/8.1 |
| 2014/0180572 | A1* | 6/2014 | Acker, Jr. ............. H04W 4/029 701/410 |
| 2016/0061933 | A1 | 3/2016 | Chung et al. |
| 2016/0150537 | A1* | 5/2016 | Jung .................... H04W 8/005 455/452.1 |
| 2016/0231415 | A1* | 8/2016 | Liao ..................... G01C 21/165 |
| 2018/0027384 | A1* | 1/2018 | Sundaram ............... H04W 4/06 455/456.1 |
| 2018/0255495 | A1* | 9/2018 | Dietrich ............... H04W 8/005 |
| 2018/0299539 | A1* | 10/2018 | Matsumoto ............... G01S 5/14 |

* cited by examiner

AUTO-LOCATION METHOD AND SYSTEM USING RADIOELECTRIC SIGNALS, CORRESPONDING PROGRAM AND PROGRAM MEDIUM

The present invention relates to the field of locating transmitters/receivers of electric signals.

BACKGROUND OF THE INVENTION

Systems are known, comprising equipment items distributed in a location and each provided with a transmitter/receiver of radioelectric signals. Radioelectric signals are, for example, of the UWB type, i.e. ultra-wide band.

In these systems, it is known to implement auto-location methods comprising the steps of:
  making each equipment item transmit signals containing an identifier of the equipment item and a time information allowing the equipment items receiving the signals to determine a measurement of a distance separating them from the transmitter equipment item,
  determining a relative position of the transmitter equipment item using distances measured by equipment receiving the signals,
  establishing a list of equipment items with their relative position and a list of measurements of distances between the equipment items.

The signals are generally sent by bursts.

The measurement of distance between the transmitter equipment item of a signal and the equipment item receiving the signal is obtained by calculation using transit time (duration having passed between the transmission moment of the signal, determinable by the receiver equipment item using time information, and the reception of the signal by the receiver equipment item) and the propagation speed of the signal in the ambient environment.

The position is obtained by a trilateration calculation.

However, it appears that the precision of the positions thus obtained is not always sufficient while being improvable in most cases.

OBJECT OF THE INVENTION

The invention in particular aims to improve the precision of the positions calculated according to such methods.

SUMMARY OF THE INVENTION

To this end, an auto-location method for electronic equipment items distributed in a location and each provided with a transmitter/receiver of radioelectric signals is provided, having at least one available operating mode determining radioelectric signal transmission and reception characteristics, the method comprising the steps of:
  making each equipment item transmit a signal containing an identifier of the equipment item and a time information allowing at least some of the equipment items receiving the signal to determine a measurement of a distance separating them from the transmitter equipment item,
  determining a relative position of the transmitter equipment item using the distances measured by the equipment items receiving the signal,
  establishing a list of equipment items with their relative position and a list of measurements of distances between the equipment items.

The method comprises the steps, implemented by at least one computer program, of:
  indexing in the list, for each equipment item, the available operating mode(s) of the transmitter/receiver,
  detecting using the list, at least one non-measured distance between a first equipment item and one second equipment item, the transmitter/receiver of which has a plurality of available operating modes,
  changing the operating mode of the transmitter/receiver of the second equipment item and attempting to measure the distance between the first equipment item and the second equipment item,
  in case of success, recalculating the positions and updating the list with the last distance measured.

It has been noted that, often, no measurement is taken for the distances between certain equipment items. Yet, the greater the number of measurements of distance, the more precise the positions calculated are. The method of the invention allows to detect these distances and to attempt to measure them, making it possible to improve the precision of the location of the equipment items.

Preferably, the radio interface of the equipment items, or of some equipment items, can advantageously have different operating modes, for example, which can be actuated by a software command to modify the signal transmission and/or reception characteristics.

It is thus possible to provide several transmission and/or reception antennas, which can be actuated through a switching component (relay, electronic switch, various outputs of an RF front end component, etc.) controlled by software. These antennas have, between them, significantly different characteristics (coverage of an angular sector, polarisation, directivity, etc.), such that either of the selected antennas will be more or less adapted to make the radioelectric signal transit in the space separating the equipment items, under the best conditions. Advantageously, the use of two omnidirectional antennas, each covering a different polarisation allows, according to that which is selected, to modify the results of the connection of about 10 dB. One of the antennas will thus be used by default by the system.

It is also possible to provide one or more transmission and/or reception amplifiers, the total gain of which will be selectable, or adjustable by means of a signal controlled by software to adapt the level of the signal transmitted and/or received in order to maximise the results of the connection between two equipment items. Advantageously, with an amplification gain varying in a range of about 10 dB, choosing the amplifier allows to make a radioelectric signal transit between two close equipment items without any saturation phenomenon (choosing the lowest gain amplifier), or between two equipment items farther away or located behind an obstacle disturbing the radioelectric transmission (choosing the highest gain amplifier). The minimum gain of the interface will thus be used by default by the system.

It is also possible to utilise a plurality of carrier frequencies for the radioelectric signal, carrier frequencies selectable by software to allow the radioelectric signal to cross obstacles of different natures. For example, a radioelectric signal in the 4 GHz band will be the most likely to cross a usual domestic space, while a radioelectric signal in the 6 GHz band will be the most likely to cross obstacles more solid than those usually encountered in a usual domestic environment. The carrier frequency corresponding to the best propagation in air will thus be used by default by the system.

Finally, it is also possible to provide, in the data transmitted by the radioelectric signal, a plurality of types of preambles selectable by software to allow to increase the probability that the receiver is synchronised when the signal received is of a low intensity. For example, the implementation of a long preamble will allow to ensure the communication at limit range by providing a significant gain with respect to a signal received, the preamble of which would be short. This extension of the preamble leading to an increase of use time of the radio interface and of the consumption, the short standard preamble will preferably be used by default by the system.

The invention also aims for a location system, a computer program for implementing the method above, and a data medium containing said program.

Other characteristics and advantages of the invention will emerge upon reading the following description of a particular and non-limiting embodiment of the invention.

BRIEF DESCRIPTION OF THE DRAWINGS

Reference will be made to the accompanying drawings, among which.

DETAILED DESCRIPTION OF THE INVENTION

Figure 1:
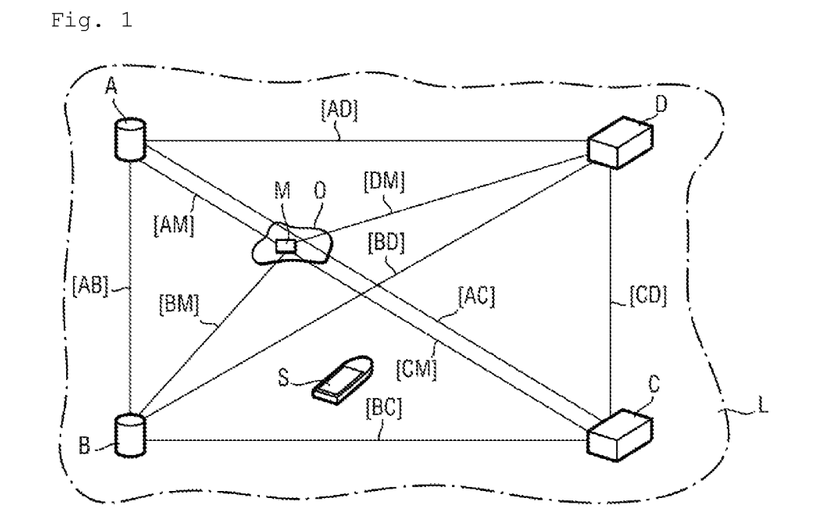
FIG. 1 is a schematic view of an auto-location system according to the invention.

In reference to the figures, the invention is described here applied to a system comprising five electronic equipment items distributed in a location L. The system here comprises four fixed equipment items, referenced A, B, C, D and a mobile equipment item, referenced M, here in the form of a tag provided with an electronic circuit and carried by an object I (like a handbag, a bunch of keys, etc.) which is here mobile or in any case, likely to be moved in the location L, but also exiting from it and entering it.

The equipment items are separated from one another by the distances [AB], [AC], [AD], [AM], [BC], [BD], [BM], [CD], [CM].

Figure 2:
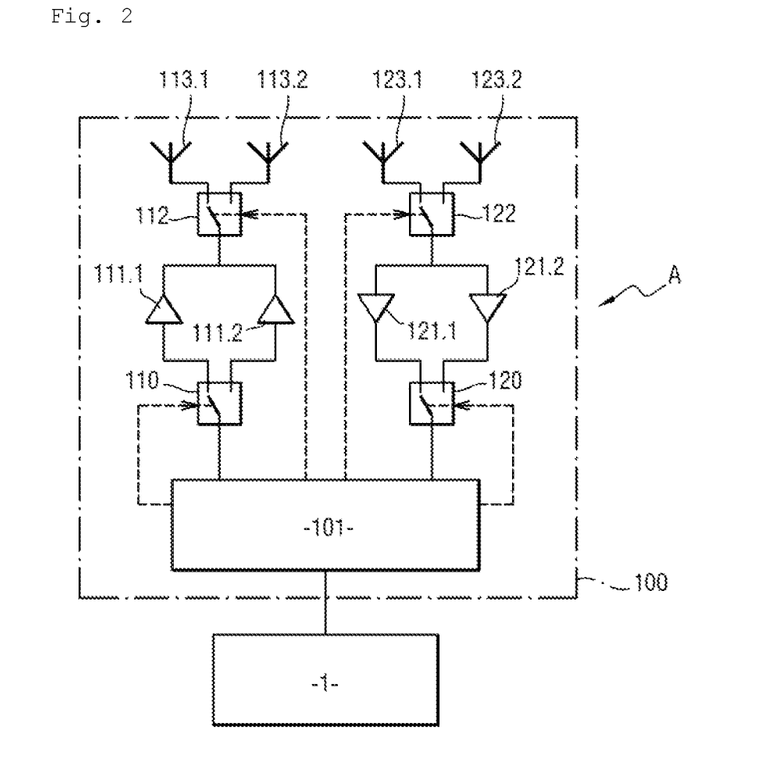
FIG. 2 is a schematic view of a first equipment item of this system.

Each of the electronic equipment items A, B, C, D comprises an electronic control circuit 1 connected to an electronic transmission circuit 101 of a transmitter/receiver generally identified as 100. The electronic transmission circuit 101 is connected, by a first selection switch 110, at the inputs of two amplifiers 111.1, 111.2, of different gains (the amplifier 111.1 having a gain less than that of the amplifier 111.2), having outputs connected to one same second selection switch 112 connected to two transmission antennas 113.1, 113.2 respectively having a horizontal polarisation and a vertical polarisation. The electronic transmission circuit 101 is also connected, by a first selection switch 120, to the outputs of two amplifiers 121.1, 121.2, of different gains (the amplifier 121.1 having a gain less than that of the amplifier 121.2), having inputs connected to a second selection switch 122 connected to two reception antennas 123.1, 123.2 respectively having a horizontal polarisation and a vertical polarisation. The electronic transmission circuit 101 is arranged in a manner known per se to encode signals to be transmitted and to decode signals received, selecting the carrier frequency for transmitting the signal (a plurality of carrier frequencies are predetermined, for example, in the 4 GHz band and in the 6 GHz band) and selecting the length of the preamble introduced in the signal (a plurality of preamble lengths are predetermined). The electronic transmission circuit 101 is also arranged here to control the selection switches 110, 112, 120, 122 (the selection switches are, for example, relays, electronic switches, various outputs of a radioelectric front end component, etc. having a command input connected to the electronic transmission circuit 101).

Thus, the transmitters/receivers 100 of the equipment items A, B, C, D are arranged to have different operating modes (also, "capability" is mentioned to identify each of these operating modes) defining signal transmission and/or reception characteristics:
    use of the transmission antenna 113.1 or of the transmission antenna 113.2;
    use of the reception antenna 123.1 or of the reception antenna 123.2;
    transmission via the amplifier 111.1 or 111.2;
    reception via the amplifier 121.1 or 121.2;
    selection of the carrier frequency of the signal prior to the transmission of the signal;
    selection of the length of the preamble prior to the transmission of the signal.

Figure 3:
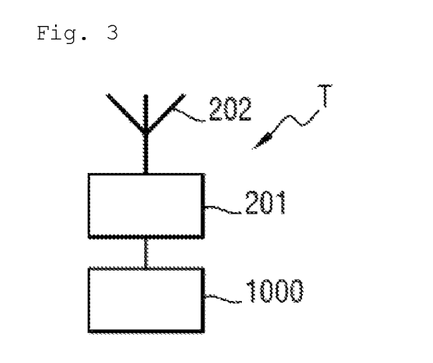
FIG. 3 is a schematic view of a second equipment item of this system.

The electronic equipment item M comprises an electronic control circuit 1000 connected to an electronic transmission circuit 201 connected to a transmission/reception antenna 102. As above, the electronic transmission circuit 201 is arranged in a manner known per se to encode signals to be transmitted and to decode signals received, to select the carrier frequency for transmitting the signal (a plurality of carrier frequencies are predetermined) and to select the length of the preamble introduced in the signals (a plurality of preamble lengths are predetermined).

Thus, the transmitter/receiver 200 of the electronic equipment item M is arranged to have different operating modes:
    selection of the carrier frequency of the signal prior to the transmission of the signal;
    selection of the length of the preamble prior to the transmission of the signal.

The system is arranged to implement an auto-location method comprising the steps of:
    making each equipment item to transmit signal bursts each containing an identifier of the equipment item and a time information, allowing each equipment item receiving one of the signals to determine a measurement of a distance separating it from the transmitter equipment item,
    determining a relative position of the transmitter equipment item using the distances measured by the items receiving the signals,
    establishing a list of equipment items with their relative position and a list of measurements of distances between the equipment items.

To this end, the transmission circuit 101 of each fixed equipment item A, B, C, D implements the location solution referenced MDEK1001 produced by the company DECAWAVE. The transmission circuit 101 here comprises two main components: a UWB component referenced DW1000, of the company DECAWAVE and a microprocessor of the company NORDIC. The microprocessor is arranged to execute a firmware-type program published by the company DECAWAVE to utilise the UWB component and configured/managed to perform the functions provided by the invention. The two components communicate with one another by a series connection. The UWB component is responsible for generating, receiving and decoding the radioelectric pulses according to the characteristics defined by the program executed by the microprocessor. The program executed by the microprocessor of each equipment item is arranged to configure and utilise the UWB component to transmit the signal bursts and receive signal bursts then, using information extracted from the signals received, to perform processing to estimate the distance between said equipment item and the other equipment items, from which it has received signals. For this, the program implements an "initiator" function (or initiator agent) allowing the equipment item to interrogate the other equipment items in its range zone and to process the exchanges in order to obtain the distances separating it from said other equipment items. The "initiator" function is automatically transferred by the system successively to the other equipment items to complete the measurements. This thus allows to successively obtain the measurements of the distances separating the equipment items.

A "concentrator" program (also called concentrator agent), which can be located in any of the fixed equipment items, even in an external server or in a smartphone, such as that represented as S in FIG. 1, is responsible for collecting the different measurements of distance taken by each of the equipment items having assumed the "initiator" function, and for processing them by a trilateration method to evaluate the precise location of each equipment item of the system.

The communication between the different devices, and between the initiator and concentrator agents, can take different paths carried by different types of connection: radioelectric connection, like here, via UWB signals or via a wireless network, for example of the Wi-Fi type (resorting to a radioelectric connection is compulsory for any mobile equipment item), or a wired connection like an Ethernet-type connection, connecting the equipment items fixed to one another.

The equipment item which will serve as a reference to the frame in which the positions of the equipment items will be determined, is here by default the first equipment item to have been switched on, and therefore to ensure the initiator function. This equipment item will be positioned at coordinates (X=0, Y=0, Z=0).

The microprocessors of the different equipment items composing the system communicate with one another through UWB signal bursts to exchange information, in particular to share all of the view of the system, or also to synchronise the reference clocks. Thus, by interrogating one of the equipment items of the system, it is easy to have an overall view of the system. The configuration of the equipment in fixed mode or in mobile mode is done by changing the value of a persistent variable in the memory of the processor during its construction or its first implementation.

Preferably, the microprocessor executing the concentrator program is also responsible for communicating with a computer program (here called supervisor software agent) via a series port mounted through a USB connection, or directly through a series connection, or also through a Bluetooth connection. The supervisor agent is executed by a microprocessor of a host device which can be any equipment item (fixed, mobile, external server, etc.). The microprocessor executing the concentrator program is thus able to receive commands to perform specific actions, and to transmit to the host device to regular intervals (each second, for example), a report on the status of the system in the form of character chains, such as shown below.

For example, the microprocessor periodically transmits to the host device, over a series connection, a status report of each of the equipment items composing the location system.

The status report is presented, for example, in the form of a character chain, such as: {'timestamp': 1569763879.354127, 'mac': c1-24-2b-c3-56-23, 'type': 'tag', 'x': 2.0143, 'y': 3.9987} {'timestamp': 1569763879.937741, 'mac': c1-24-2b-c2-27-ef, 'type': 'anchor', 'x': 0.0, 'y': 0.0} {'timestamp': 1569763879.940737, 'mac': c1-24-2b-c2-28-ea, 'type': 'anchor', 'dist': 6.00234, 'x': 6.0, 'y': 0.0} {'timestamp': 1569763879.943739, 'mac': c1-24-2b-c2-25-63, 'type': 'anchor', 'dist': 8.74452, 'x': 8.0, 'y': 3.5}

Each line corresponding to one of the equipment items of the system, the following fields are easily detected there, associated with a value:
  timestamp: transmission date of the report by the location system,
  mac: the unique identifier of the equipment item,
  type: type of the equipment item with "tag" for a mobile equipment item and "anchor" for a fixed equipment item,
  x and y: coordinates in metres of the equipment item in the reference frame formed by the fixed equipment items. The coordinates of the fixed equipment items are here defined at almost 0.5 m, while the coordinates of the mobile equipment item are defined at almost a few millimetres. The precision can be different, even less, according to the precision made possible by the characteristics of the system.
  dist: distance in metres between the equipment item in question and the equipment item forming the origin of the frame. This information does not exist for the mobile equipment item, nor for the equipment item forming the origin of the frame.

The report in question lists here the following equipment items:
  a mobile equipment item M located at the coordinates x=2.0143 m; y=3.9987 m,
  the fixed equipment item A forming the origin of the frame and located at the coordinates x=0 m; y=0 m,
  the fixed equipment item B located at the coordinates x=6.0 m, y=0 m at a distance of 6.00234 m of the fixed equipment item A,
  the fixed equipment item C located at the coordinates x=8.0 m, y=3.5 m at a distance of 8.75643 m of the fixed equipment item A.

This information is provided via the USB connection to the host device, it is easy for the supervising agent embedded in this device to collect it and to process it.

According to the invention, the method further comprises the steps of:
  indexing in the list, for each equipment item, the available operating mode(s) of the transmitter/receiver of each equipment item,
  detecting, using the list of distances, at least one non-measured distance between a first equipment item and one second equipment item, the transmitter/receiver of which has a plurality of available operating modes, changing the operating mode of the transmitter/receiver of the second equipment item and attempting to measure the distance between the first equipment item and the second equipment item, in case of success, recalculating the position and updating the list with the last distance measured.

This operating mode will be detailed below.

Thus, the program executed by the microprocessor of the host device is arranged to obtain the system, in response to a command taking the form get capability (mac), a list of the different operating modes (or "capabilities") of the transmitter/receiver 100 of each equipment item.

The return of the command presents, in the form of a character chain, the different capabilities of the equipment item classified from the least limiting capability in terms of implementation (which will be the capability by default) up to the most limiting capability. The aim being to utilise these capabilities from the least limiting up to the most limiting.

For example, the fixed equipment items comprise a plurality of antennas 113.1, 113.2, 123.1, 123.2 used in transmission and/or in reception. The antennas 113.1, 113.2 et 123.1, 123.2 having different characteristics, the radio propagation conditions, will therefore be selectable by the software of the initiator functionality at the moment when this will be sought to enter into communication with a device in particular. In this example, the device therefore has a dual capability (pol_H and pol_V) selectable by the program. The capability pol_H (horizontal polarity) is selected by default as it corresponds to the rest position of the selection switch 112, 122. These capabilities are entered into the non-volatile memory of the equipment item during its construction according to the capabilities that it is actually provided with. For example, for the device mentioned as an example, the return of the command will take the form: {'eq_id': c1-24-2b-c2-28-ea, 'cap1': 'pol_H', 'cap2': 'pol_V', 'cap3': NULL}.

It is easy to recognise the two capabilities 1 and 2 respectively corresponding to the two horizontal (H) and vertical (V) polarities there, and a capability 3 having a value NULL to highlight the fact that the device only has two possible radioelectric configurations. In a variant, a different implementation of the command and of its return would have to be able to show a field indicating the number of capabilities, and fields showing each of them.

According to the invention, the supervising software agent is implemented to manage:

the knowledge of the different equipment items, the determination of the measurements of all the distances between the equipment items, and the status of the actual communications corresponding to each of the distances.

The supervising software agent can be located in one of the equipment items of the system by using the available hardware and software resources, it can also be remote in an external equipment item communicating with at least one of the equipment items of the system by means of the connection described above. This agent can also be partially distributed between a plurality of equipment items of the system.

The supervising software agent is arranged to perform a plurality of operations.

A first operation consists of maintaining a list of the different equipment items composing the system in the background, in the supervising agent.

This list can be obtained, for example, by utilising the report generated by the system as shown above.

It is indeed easy to identify the equipment items composing the system there, broken down into a series of fixed equipment items, identified by the word "anchor" in the field "type" and identified by their coordinates, and in one or more mobile equipment items identified by the word "tag" in the field "type" and also identified by their coordinates.

This list is advantageously stored in the form of recordings in a first "equipment item table" of a database held by the supervising agent. This entry in this first table comprises, as a minimum, the identification of the corresponding equipment item which is stored, for example, in a field MAC_equipement.

Figure 4:
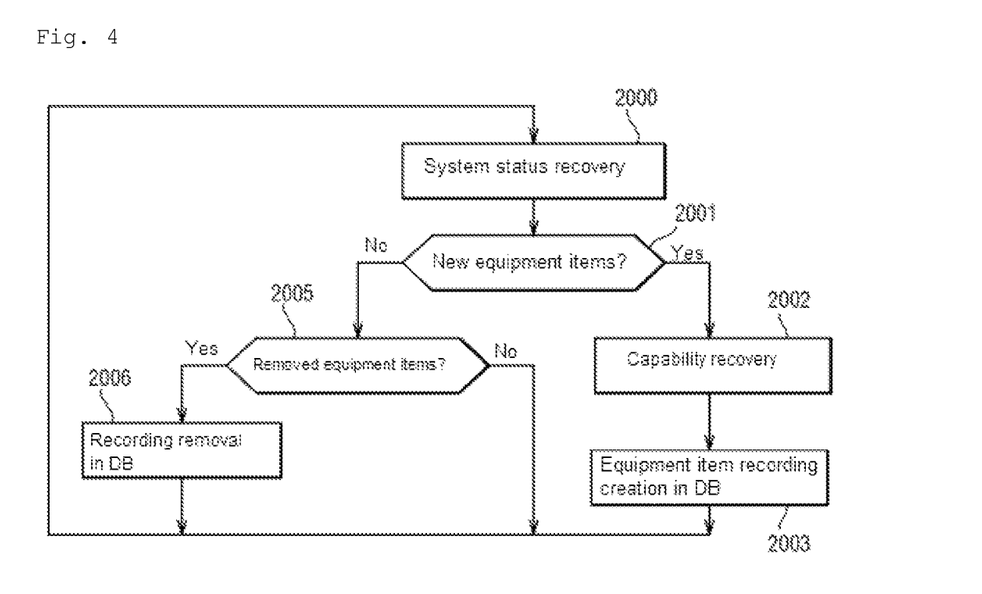
FIG. 4 is a block diagram illustrating the updating of the list of equipment items.

Preferably, as represented in FIG. 4, the system is programmed such that the supervising agent is alerted of the recording or of the removal of an equipment item during its recording or of its removal from the location system.

Upon each recovery of the status of the system (2000), it is started by searching if there are new equipment items (2001) and, if so, the capabilities (2002) are recovered and the recording of each added equipment item (2003) is created.

During the addition of the equipment items, the type of the equipment item will be specified in a field Type_equipement and the operating modes (capabilities) will also be specified in additional fields, for example, in a field Modes_radio of the equipment item table containing the list of the operating means or modes which could be implemented in the equipment item, classified by order of priority. An equipment item without alternative operating means or modes can be entered into this field with the value NULL.

Thus, the equipment item table corresponding to the preceding example could, as a minimum, take the form:

c1-24-2b-c3-56-23,
   tag,
   NULL
c1-24-2b-c2-27-ef,
   anchor,
   pol_H, pol_V
c1-24-2b-c2-28-ea,
   anchor,
   pol_H, pol_V
c1-24-2b-c2-25-63,
   anchor,
   pol_H, pol_V It is also searched, if there are removed equipment items (2005) and these are removed from the table, if necessary (2006).

A second operation consists of maintaining, in the background in the supervising agent, a list of all the distances existing between the equipment items.

Indeed, there is potentially a communication link between each of the equipment items taken two-by-two. This potential connection is also called "segment". The system, by its native functioning, determines the length of the segments (length also called distance) to deduce from it, the relative position of one of the equipment items using a trilateration calculation. Therefore, for the performance of the system, the measurement of the largest number possible of segment lengths (or distances) must be taken.

This list of potential segments corresponds to all of the combinations, in pairs, of the equipment items obtained during the first operation. Therefore, there are $(n(n-1))/2$ potential segments for n equipment items. This list can be stored in a "segment table" of the database. Each entry in the segment table here comprises the identification of the segment, for example in the form of a dual field ID_equipement1, ID_equipement2 containing the identifications of the equipment items located at the ends of the segment, such as entered into the equipment item table.

Figure 5:
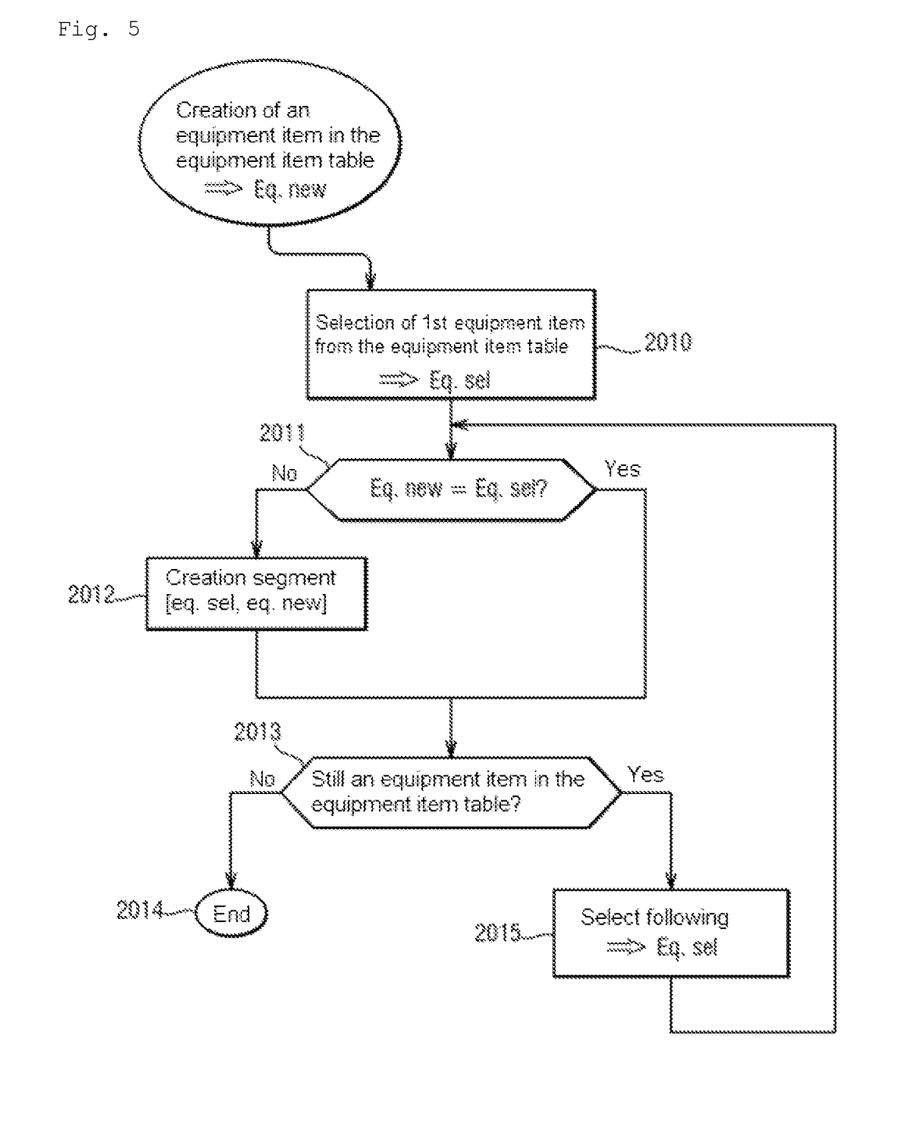
FIG. 5 is a block diagram illustrating the addition of a distance in the list of distances.
Figure 6:
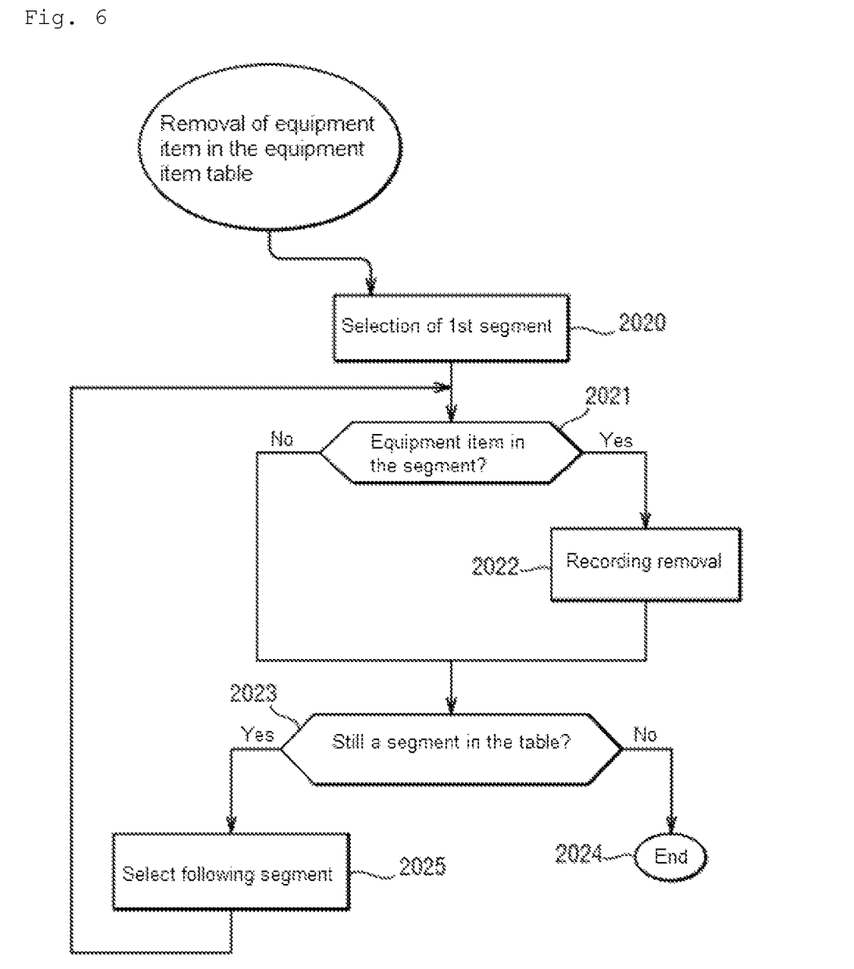
FIG. 6 is a block diagram illustrating the removal of a distance in the list of distances.

As represented in FIGS. 5 and 6, this list of segments will be supplemented with recordings of new potential segments according to the appearance of new equipment items in the equipment item table, and the recordings corresponding to the segments made obsolete will be removed from the base at the time of the removal of the equipment item from the equipment item table.

Thus, when a new equipment item is created in the list of equipment items, the program explores the list of equipment items systematically (FIG. 5) to:
  select one of the equipment items (step 2010),
  verify if the equipment item selected is the new equipment item (step 2011),
  if not, create in the list of segments (step 2012), a new segment having as the end, the equipment item selected and the new equipment item and go to the following step or, if so, go directly to the following step,
  verify if there is also an equipment item not having been selected (step 2013),
  if not, interrupt the segment addition process (step 2014) and, if so, select said equipment item not having been selected (step 2015) and return to step 2011.

Thus, when an equipment item is removed from the list of equipment items, the program explores the list of segments systematically (FIG. 6) to:
  select one of the segments (step 2020),
  verify if the removed equipment item belongs to the selected segment (step 2021),
  if so, remove the selected segment from the list of segments (step 2022) and go to the following step, or, if not, go directly to the following step,
  verify if there is also a segment not having been selected (step 2023),
  if not, interrupt the segment addition process (step 2024) and, if not, select said segment not having been selected (step 2025) and return to step 2021.

The list of segments is utilised by the supervising agent as will be explained.

The location system periodically and autonomously triggers, on each of the equipment items via the initiator function, measurements of distance for each of the different segments, then utilises, via its concentrator functionality, these measurements to estimate the relative location of the different equipment items.

It is therefore possible, by interrogating the functionality of the concentrator, to know, at any moment, the length of the different segments actually measured by the location system. This information can be obtained in response to a command of type get segments, the response of which, in the form of a character chain, for example takes the form:
  {'timestamp': 1569763879.937741, 'eq1_id': c1-24-2b-c2-27-ef, 'eq2_id': c1-24-2b-c2-28-ea, 'dist': 6.00234} {'timestamp': 1569763879.937869, 'eq1_id': c1-24-2b-c2-28-ea, 'eq2_id': c1-24-2b-c2-25-63, 'dist': 4.05231} {'timestamp': 1569763879.937992, 'eq1_id': c1-24-2b-c2-27-ef, 'eq2_id': c1-24-2b-c3-56-23, 'dist': 4.47739} {'timestamp': 1569763879.938069, 'eq1_id': c1-24-2b-c2-28-ea, 'eq2_id': c1-24-2b-c3-56-23, 'dist': 5.64748} {'timestamp': 1569763879.938612, 'eq1_id': c1-24-2b-c2-25-63, 'eq2_id': c1-24-2b-c3-56-23, 'dist': 6.00748}

In this character chain, it is easy to recognise the length information (that is the measurements of distance), and therefore to observe the actual existence of certain potential segments.

This length information, or the absence of length information, can be used by the supervising agent to update the recordings of the segment table.

Thus, a recording of the segment table can advantageously contain the following fields:
  ID_Equipement1, ID_Equipement2 to identify the segment. It can be advantageous to classify the two identifiers to always place a fixed equipment item as first equipment item, and in the case of two equipment items of the same type, to place as first equipment item, that of which the MAC address is the smallest. This allows to avoid confusion in the naming of the segments;
  Longueur_courante for the result of the current measurement, or NULL if the measurement is impossible;
  Heure_dernière mesure_valide for time stamping the last valid measurement, or NULL if no available measurement from switching on;
  Longueur_valide for the actual length of the segment retained for trilateration, or NULL if no valid length.

Each recording of the segment table will be advantageously supplemented with the radio operating means or mode (capability) to be implemented in each of the end equipment items during the next communications. This information can be stored, for example, in two fields Eq1_mode courant and Eq2_mode courant containing the element of the list of operating modes contained in the corresponding recording of the equipment item table to be implemented during the next radio communication between the end equipment.

Advantageously, during the creation of a potential segment in the list of segments, the highest priority modes of each of the end equipment items will be recopied in the corresponding fields of the segment table.

The segment table filled with information of the preceding example would thus show, for example:
  c1-24-2b-c2-27-ef, c1-24-2b-c2-28-ea
    pol_H, pol_H
    6.00234
    1569763879.937741
    6.00234
  c1-24-2b-c2-25-63, 6c1-24-2b-c2-27-ef
    pol_H, pol_H
    NULL
    NULL
    8.74452
  c1-24-2b-c2-25-63, c1-24-2b-c2-28-ea
    pol_H, pol_H
    4.05231
    1569763879.937869
    4.05231
  c1-24-2b-c2-27-ef, c1-24-2b-c3-56-23
    pol_H, NULL
    4.47739
    1569763879.937992
    4.47739
  c1-24-2b-c2-28-ea, c1-24-2b-c3-56-23
    pol_H, NULL
    5.64748
    1569763879.938069
    5.64748
  c1-24-2b-c2-25-63, c1-24-2b-c3-56-23
    pol_H, NULL
    6.00748
    1569763879.938612
    6.00748

The supervising agent periodically performs a rapid analysis of the segment table which can highlight a certain number of segments, the length of which has never been able to be estimated, and a certain number of segments, the length of which has never been able to be estimated can no longer be estimated, for example a segment of which the length has not been evaluated for more than 10 seconds.

This absence of any estimation starts with it being impossible to establish a reliable communication between the equipment items.

The communication technology used by the equipment items limits the maximum range at a specified value, for example 20 metres. Therefore, if the two equipment items are separated by a distance greater than this limit, any communication will be technically impossible. In this case, the potential segment has no chance of existing in reality. Therefore, it must be identified as such in the list of segments.

Figure 7:
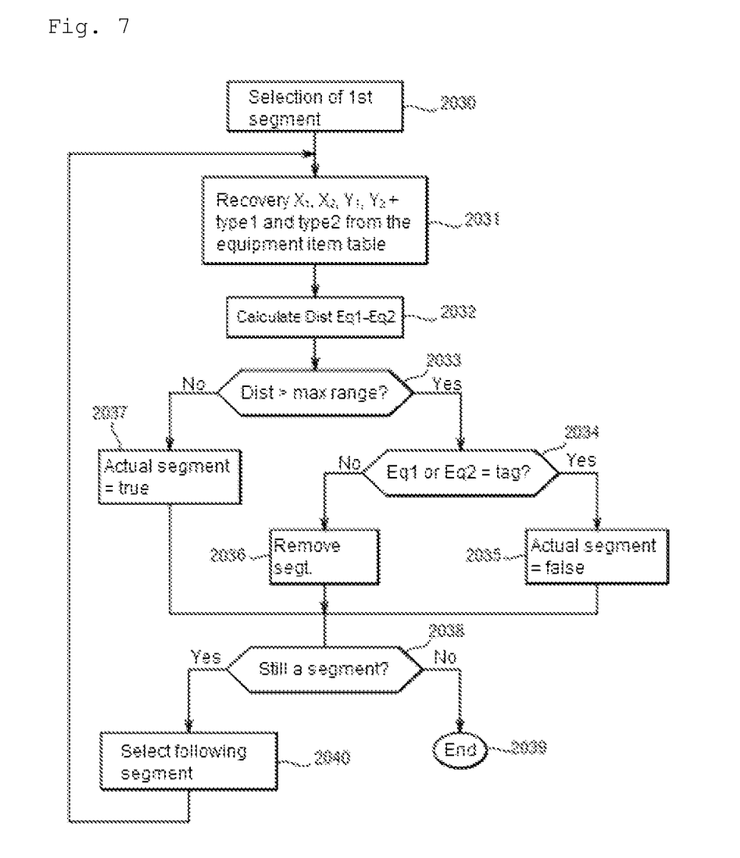
FIG. 7 is a block diagram illustrating the utilisation of the list of distances.

The verification and the updating of the list of non-estimated segments will be advantageously performed cyclically by the supervising agent, for example every minute (see FIG. 7).

The supervising agent selects one segment from the list of segments (step 2030) and recovers the corresponding coordinates of the equipment items (step 2031).

The supervising agent calculates (step 2032) the measurement of distance separating the two equipment items (that is the length of the segment) by the current formula for calculating the distance between two points $A(x_A, y_A)$ and $B(x_B, y_B)$:

$$AB = \sqrt{(x_B - x_A)^2 + (y_B - y_A)^2}$$

The supervising agent then verifies if the distance calculated is greater than a threshold value (step 2033). The threshold value corresponds to the theoretical maximum range characterising the location system (for example, 20 m), i.e. the maximum range of the transmitters/receivers of the equipment items. An alternative is presented:
  a. if the distance calculated between the two equipment items located at the ends of the segment is greater than a threshold value, the supervising agent verifies if one of the equipment items of the segment is a mobile equipment item (step 2034):
    the corresponding recording in the list will be supplemented with a field showing the uselessness of the potential segment (for example, a field Segment_realiste) which will take the "false" value in this case (step 2035) and the recording is not removed, as according to the movements of the mobile equipment item, it is possible that it returns to the theoretical maximum range of the system.
    the recording corresponding to the segment will be removed from the segment table (step 2036). This method is chosen if the two equipment items of the segment are of the fixed type. Indeed, the movement of one of the equipment items could require it being switched off, this will be conveyed by a "disappearance" of the equipment item as regards the system. This disappearance has the consequence of actions, like the updating of the list of equipment and of the list of segments. The disappearance is followed by a "reappearance" of the equipment item at the time of it being switched back on. This reappearance will be treated as such with the updating of the list of equipment and the creation of potential segments in the list of segments.
  b. if the distance calculated between the two equipment items located at the ends of the segment is less than the threshold value, the field showing the uselessness of the potential segment (field Segment_realiste) takes a "true" value in this case (step 2037). However, the propagation conditions of the radioelectric signal do not allow the connection, which is satisfactory for taking the measurement, so it is probable that an action on the capabilities of one of the end equipment items can improve the situation, as will be seen below. This situation can occur from the commissioning of the system, a mobile equipment item extending from one of the fixed equipment items can appear later, during the movement of an element.

The supervising agent:
  then verifies if there is also a segment not having been selected (step 2038),
  if not, interrupts the segment verification process (step 2039) and, if so, selects said segment not having been selected (step 2040) and returns to step 2031.

Therefore, this results in a certain number of potentially utilisable segments for which an action must be implemented.

In the example, an action must, in particular, be taken to attempt to resolve the segment [AC] (c1-24-2b-c2-25-63, 6c1-24-2b-c2-27-ef).

Figure 8:
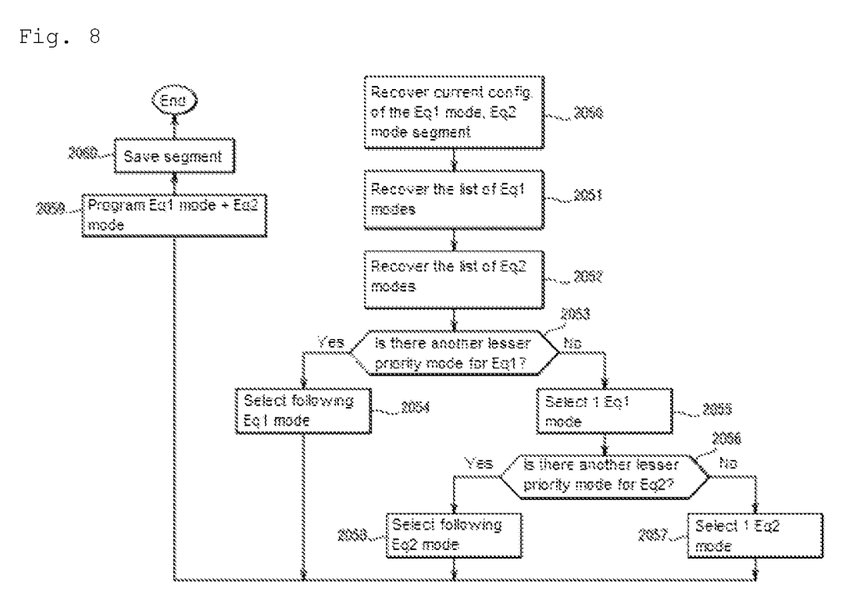
FIG. 8 is a block diagram illustrating the adaptation of the operating modes of the transmitters/receivers.

Thus, the supervising agent executes a third operation which consists of processing the potentially utilisable segments to attempt to obtain a measurement (see FIG. 8).

For this, the supervising agent recovers:
  the configuration of the equipment items of the segment to be measured (step 2050) using the equipment item table, as well as the implementation conditions during the last attempt to measure (the operating mode used) and which are available in the corresponding recording of the segment table,
  the capabilities of each of the equipment items located at the ends of the segment to be measured (steps 2051, 2052).

The supervising agent will then:
  verify that there is an operating mode of the first of the equipment items of the segment which has a lesser priority than the operating mode used during the last attempt (step 2053),
  if so, command the selection of this operating mode (step 2054),
  if not, leave the operating mode of the first equipment item unchanged (step 2055) and:
  verify that there is an operating mode of the second of the equipment items of the segment which has a lesser priority than the operating mode used during the last attempt (step 2056),
  if so, command the selection of this operating mode (step 2057),
  if not, command the selection of the immediately superior operating mode (step 2058),
  perform a distance measurement operation (step 2059),
  record the result from the distance measurement operation (step 2060).

According to the preceding example, to resolve the segment [AC], it is possible to act on the transmitter/receiver of the equipment item A, or on the transmitter/receiver of the equipment item B, or on both of them.

The equipment items A and B each have two capabilities pol_H and pol_V, and the configuration by default highlighting for each, the function pol_H, the supervising agent will select the function pol_V for the equipment item A and preserve the function pol_H for the equipment item B.

Then, the supervising agent will act on the initiator agent of the equipment item A to limit it to using the function selected during the next interrogation of the equipment item located at the other end of the segment.

The command used is a command set_config (ID_Equipement1, mode_radio, ID_Equipement2) which is transmitted to the initiator agent of the equipment item C. This command is, for example, as follows:

ID_Equipement1 represents, for example, the MAC address of the selected initiator equipment item (c1-24-2b-c2-25-63 for the equipment item C), mode_radio represents the operating mode of the radio interface of the initiator (pol_V for the vertical polarisation antenna), ID_Equipement2 represents, for example, the MAC address of the equipment item located at the other end of the segment (6c1-24-2b-c2-27-ef for the equipment item A).

Upon reception of the command, the initiator agent of the equipment item A will apply the new operating mode by positioning the command signal of the selection switch 122 to activate the vertical polarisation antenna for the whole duration, during which it will attempt to specifically interrogate the equipment item C.

During its next utilisation of the segment table (such as shown relative to the second operation), in particular during the recovery of the last measurements of segments, the supervising agent will update the corresponding recording in the segment table, by changing the fields Eq1_mode courant and Eq2_mode courant by the modes newly selected, and by updating the result of the actual measurement.

If the new configuration selected has allowed to result in a measurement, thus, automatically this configuration will be reused systematically by the initiator agent during its next attempts to communicate with the equipment item located at the other end of the segment, as the segment will be considered as resolved, and the configuration will not be questioned.

If the new selected configuration has not allowed to resolve the measurement of the segment, then the segment will again be processed by the third operation by utilising another combination of configurations.

It is also provided to optimise the segment table.

During the appearance of a new equipment item in the system, this will not necessarily be localised. Indeed, an equipment item will be known as soon as at least one segment will be determined.

The distance separating it from the initiator equipment item having discovered it will be measured. Its position will therefore be located in any point of the circle, the centre of which occupies the position of the initiator equipment item and the radius of which corresponds to the measurement.

If this is a fixed equipment item, with its theoretical maximum range being known, it cannot enter into communication with the equipment items located outside of this maximum range.

Consequently, the equipment items located outside of a zone centred on the initiator equipment item and the radius of which corresponds to the increased maximum distance of the theoretical maximum range cannot, in any case, enter into communication with the new equipment item. The corresponding segments do not need to be created.

For example, the equipment item B has been detected by the equipment item A, as being at a distance d(AB), therefore on one of the points of the circle of radius d(AB) centred on the equipment item A. Not knowing the exact position of B, but knowing its theoretical maximum range P(B), all the equipment items located in the circle of radius R=d(AB)+P(B) will be able to enter into communication with the equipment item B. All those located outside of this circle cannot be, and the corresponding segments will not be created.

Naturally, the invention is not limited to the embodiment described, but comprise any variant entering into the scope of the invention, such as defined by the claims.

In particular, the system can have a different structure from that described.

The equipment item number can be different, likewise, their structure.

The antennas can have different polarisations and/or different directivities and/or different angular sectors.

All the equipment items do not necessarily have the same capabilities. Other capabilities than those mentioned can be considered.

The fixed equipment items can be dedicated to the auto-location or can have other functions, like a router function, an internet gateway function, a multimedia decoder function, etc.

The invention has been described to show a two-dimensional positioning, it is also possible to force the system into 3D mode as soon as four fixed equipment items at least are used in a space and not in a plane.

At least two of the equipment items can be connected to one another by a wired electric connection and the distance between them can be measured by means of signals transmitted over the wired electric connection.

The method can also be modified with respect to what has been described. The optimisation of the list of segments is, for example, optional. The list of segments and the list of equipment items can be grouped together in one single list. It must be noted that the words "table" and "list" are used without distinction in the present description. The same applies for the words "segment" and "distance".

The computer program implementing the method can be executed on one of the fixed equipment items of the system, on a dedicated device, or be divided into sub-programs, the execution of which is distributed or not over a plurality of equipment items and/or dedicated devices.

The transmission circuit 201 can comprise two main components: a UWB component, bearing the reference DW1000, of the company DECAWAVE and a microprocessor of the company NORDIC.

Any location solution other than that of the company DECAWAVE can be used, from the moment when it is compatible with the operation described.

The invention claimed is:

1. An auto-location method for electronic equipment items distributed in a location and each provided with a transmitter/receiver of radioelectric signals having at least one available operating method determining transmission and reception characteristics of the radioelectric signals, the method comprising the steps, implemented by at least one computer program, of:

transmitting, by each of the electronic equipment items, a signal containing an identifier of the electronic equipment item and time information, receiving, by at least some of the electronic equipment items, the signal transmitted by at least one of said each of the electronic equipment items and determining a measurement of a distance separating the electronic equipment items receiving the signal and the transmitting electronic equipment item, determining a relative position of the transmitting electronic equipment item using distances measured by the electronic equipment items receiving the signal transmitted by the transmitting electronic equipment item, calculating positions of and distances between the electronic equipment items based on the relative positions of the electronic equipment items, establishing a list of electronic equipment items with their relative position and a list of the distances between the electronic equipment items and storing the list of electronic equipment items and the list of measurements of distances in a database, indexing in the list, for each of the electronic equipment items, the at least one available operating mode of the transmitter/receiver, detecting, using the list, at least one distance between a first electronic equipment item and a second electronic equipment item, the transmitter/receiver of which has a plurality of available operating modes, changing the operating mode of the transmitter/receiver of the second electronic equipment item and measuring the distance between the first electronic equipment item and the second electronic equipment item, determining whether measuring the distance between the first electronic equipment item and the second electronic equipment item is successful, and when the measuring the distance between the first electronic equipment item and the second electronic equipment item is determined successful, recalculating the positions of the first electronic equipment item and the second electronic equipment item and updating the list with the distance measured in the database.

2. The method according to claim 1, comprising the steps of recording a new electronic equipment item and of transmitting at least one signal to measure the distance separating the new electronic equipment item from at least one first from the electronic equipment items.

3. The method according to claim 2, wherein, knowing a theoretical maximum range of the transmitter/receiver of the new electronic equipment item and having the measurement of distance between the new electronic equipment item and the first electronic equipment item, no attempt is made to measure distance between the new electronic equipment item and electronic equipment items which would be away from the first electronic equipment item by a distance greater than the sum of the theoretical maximum range of the transmitter/receiver of the new electronic equipment item and the measurement of distance between the new electronic equipment item and the first electronic equipment item.

4. The method according to claim 1, wherein the operating modes relate to:
a plurality of antennas connected to a selection switch.

5. The method according to claim 4, wherein the antennas have different polarisations and/or different coverage sectors and/or different directivities.

6. The method according to claim 1, wherein the operating modes relate to:
a plurality of transmission amplifiers connected to a selection switch, and/or
a plurality of reception amplifiers connected to a selection switch.

7. The method according to claim 6, wherein the amplifiers have different gains.

8. The method according to claim 7, wherein the gains are comprised within an about 10 dB range.

9. The method according to claim 1, wherein the operating modes relate to different carrier frequencies of the transmitted signal.

10. The method according to claim 1, wherein the operating modes relate to signal preambles having different lengths.

11. The method according to claim 1, wherein at least two of the electronic equipment items are connected to one another by a wired electric connection and the distance between them is measured by means of signals transmitted over the wired electric connection.

12. An auto-location system comprising the electronic equipment items distributed in a location and each provided with a transmitter/receiver of radioelectric signals having at least one available operating mode determining transmission and reception characteristics of the radioelectric signals, wherein the system is arranged to implement the method according to claim 1.

13. A non-transitory computer-readable data medium containing a computer program comprising instructions arranged to implement the method according to claim 1.

* * * * *